United States Patent
Taillie et al.

(10) Patent No.: US 7,419,695 B1
(45) Date of Patent: Sep. 2, 2008

(54) SOY PROTEIN BLEND FOR SOFT CONFECTIONARY FOOD BARS

(75) Inventors: Steven A. Taillie, St. Louis, MO (US); Myong J. Cho, Chesterfield, MO (US)

(73) Assignee: Solae, LLC, St. Louis, MO (US)

( * ) Notice: Subject to any disclaimer, the term of this patent is extended or adjusted under 35 U.S.C. 154(b) by 546 days.

(21) Appl. No.: 10/447,915

(22) Filed: May 22, 2003

(51) Int. Cl.
*A23G 3/44* (2006.01)
*A23J 1/00* (2006.01)

(52) U.S. Cl. .................. 426/656; 426/634; 426/660

(58) Field of Classification Search .......... 426/656, 426/634, 660
See application file for complete search history.

(56) References Cited

U.S. PATENT DOCUMENTS

| | | | |
|---|---|---|---|
| 3,814,819 A | 6/1974 | Morgan | 426/72 |
| 4,152,462 A | 5/1979 | Hayward et al. | 426/72 |
| 4,415,596 A | 11/1983 | Andersen et al. | 426/103 |
| 4,443,540 A | 4/1984 | Chervan et al. | 435/69 |
| 4,832,971 A | 5/1989 | Michnowski | 426/302 |
| 4,900,566 A | 2/1990 | Howard | 426/72 |
| 5,360,618 A | 11/1994 | Walker | 426/72 |
| 5,389,395 A | 2/1995 | Joseph et al. | 426/72 |
| 5,545,414 A | 8/1996 | Behr et al. | 424/484 |
| 5,612,074 A | 3/1997 | Leach | 426/74 |
| 6,063,432 A | 5/2000 | Maxwell et al. | 426/656 |
| 6,299,929 B1 | 10/2001 | Jones | 426/656 |
| 6,432,457 B1 | 8/2002 | Jones | 426/2 |
| 6,465,032 B1 | 10/2002 | Hollar | 426/506 |
| 2005/0118323 A1* | 6/2005 | Sault et al. | 426/645 |

FOREIGN PATENT DOCUMENTS

| | | |
|---|---|---|
| WO | WO 9948379 | 9/1999 |
| WO | WO 9959433 | 11/1999 |
| WO | WO 9962351 | 12/1999 |
| WO | WO 0122835 | 4/2001 |
| WO | WO 0201962 | 1/2002 |
| WO | WO 02071857 | 9/2002 |

* cited by examiner

*Primary Examiner*—Anthony Weier
(74) *Attorney, Agent, or Firm*—Holly M. Amjad; James L. Cordek

(57) ABSTRACT

The present invention provides a soy protein containing composition for use in formulating confectionary food bars. In particular, the soy protein containing composition is formed of two types of protein materials, a structural protein material and a binding protein material. The protein composition provides a soft, palatable texture to confectionary food bars in which it is incorporated. The present invention is also directed to soft confectionary food bar compositions containing a structural soy protein material and a binding soy protein material, and processes for making such food bar compositions.

14 Claims, 2 Drawing Sheets

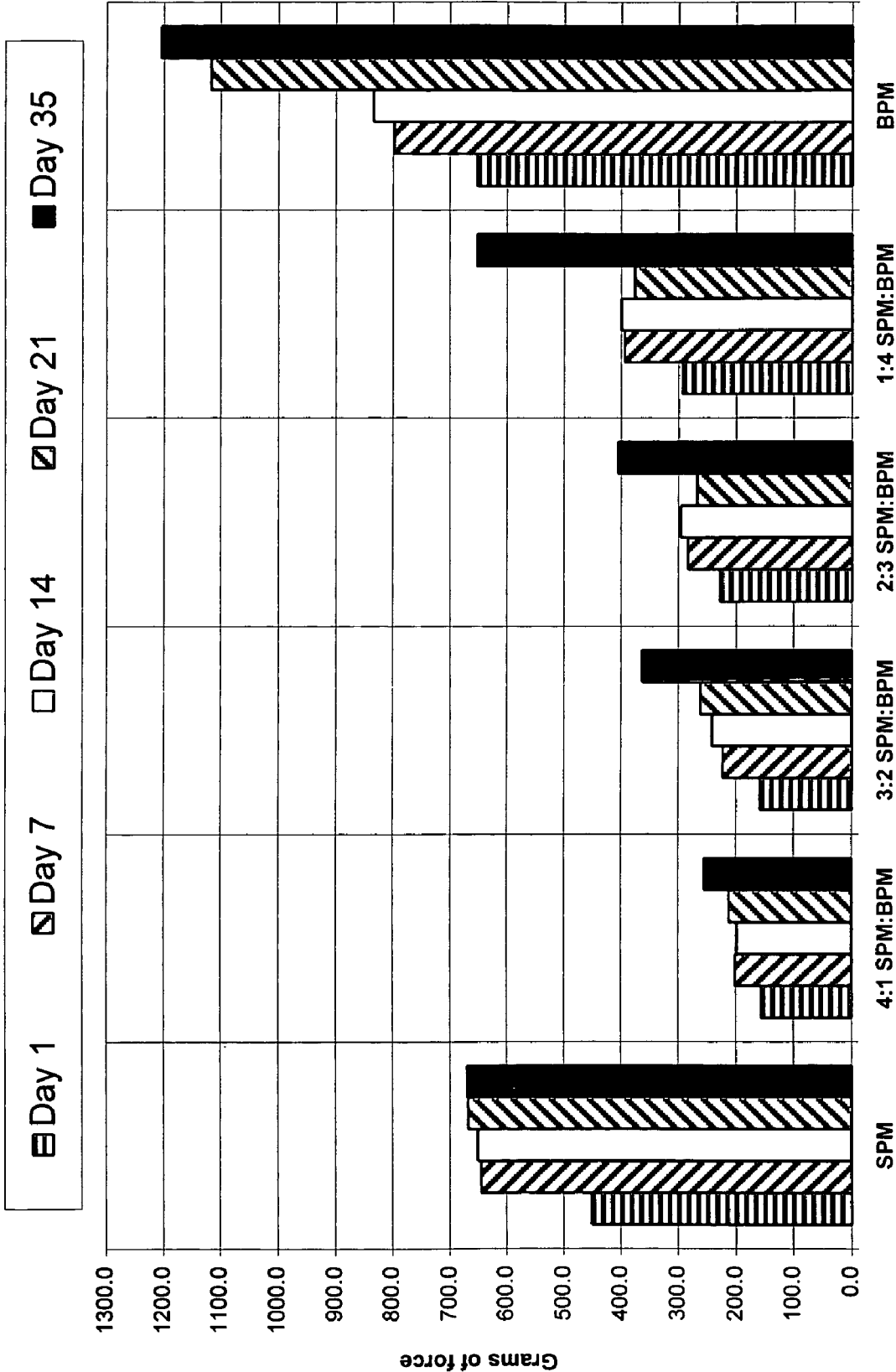

SOY PROTEIN BLEND FOR SOFT CONFECTIONARY FOOD BARS

FIELD OF THE INVENTION

The present invention relates to confectionary food bars, and particularly to soy protein containing soft confectionary food bars having a long shelf-life.

BACKGROUND OF THE INVENTION

Confectionary food bars have become a popular consumer choice for a variety of reasons. One reason for their popularity is that food bars are frequently used as a nutrition source for people "on the go" who don't have time for a meal. Another reason is that high protein food bars are used by athletes to enhance athletic performance and to help build body mass. Furthermore, dieters often use food bars as low calorie "meal replacers" in weight loss programs. As a result, the food bar industry has grown tremendously in the past ten years.

Confectionary food bars are also utilized to obtain health benefits, such as lower total blood cholesterol concentrations. Confectionary food bars are typically formulated to contain protein, carbohydrates, and flavorings. The U.S. Food and Drug Administration has recognized soy protein as useful for lowering blood cholesterol concentrations, therefore, soy protein is utilized as a preferred protein material in food bars to formulate health promoting food bars. Health promoting food bars must include relatively high levels of soy protein in the food bar formulation in order to be useful as "health promoting". Typical health promoting food bars contain from 20% to 45% soy protein, by weight.

Inclusion of high levels of protein in a food bar, however, negatively affects the texture, palatability, and shelf-life of the food bar relative to food bars containing less protein and more carbohydrates. High protein levels, e.g. 20% to 45% by weight, in a food bar cause the bar to become texturally hard and bricklike. As a result, the food bar is unpalatable to a consumer since it is hard to chew.

U.S. Pat. No. 6,299,929 discloses bars which partially overcome the disadvantages of confectionary food bars containing high levels of protein. These bars utilize a proteinaceous material having low water absorption properties and medium to high emulsification properties in combination with a carbohydrate material to form chewy food bars having a protein to carbohydrate weight ratio of greater than 1. The critical feature of the proteinaceous material that provides the desired chewiness is a dissociation between water hydration properties of the proteinaceous material and other functional characteristics of the proteinaceous material. The proteinaceous material used in the food bars is preferably a mixture of "binding" proteins having low water absorption, medium to high emulsification properties, and low to medium viscosity and denatured "filler" proteins having low functionality, in particular, low water absorption and low viscosity. The limiting amounts of binding protein and filler protein relative to each other are 100% binding protein:0% filler protein to 100% filler protein:0% binding protein, where the relative amounts of each type of protein are selected on the basis of flavor, price, availability, and nutrition.

It is desirable, however, to provide new soft and palatable confectionary food bars having high levels of protein. It is further desirable to provide such soft confectionary food bars where the food bars have an extended shelf life in which they maintain their softness over an extended period of time. Therefore, it is an object of the present invention to provide a novel soft confectionary food bar containing high levels of protein, where the novel high protein food bar has an extended shelf-life for maintaining its softness.

SUMMARY OF THE INVENTION

In one aspect, the present invention is a protein containing composition for use in confectionary food bars. The protein containing composition contains a structural protein material and a binding protein material, where the binding protein material is dispersed in the structural protein material. The structural protein material contains at least 90% soy protein, by weight; has a soluble solids index of between 20% and 40%; and has a trinitrobenzene sulfonic acid index value of less than 35. The binding protein material contains at least 90% soy protein, by weight; has a soluble solids index of at least 70%; and has a soluble trinitrobenzene sulfonic acid index value of at least 75.

In another aspect, the present invention is a confectionary food bar containing a structural protein material, a binding protein material, and a carbohydrate, where the confectionary food bar contains from 20% to 45% soy protein, by weight. The structural protein material contains at least 90% soy protein, by weight; has a soluble solids index of between 20% and 40%; and has a trinitrobenzene sulfonic acid index value of less than 35. The binding protein material contains at least 90% soy protein, by weight; has a soluble solids index of at least 70%; and has a soluble trinitrobenzene sulfonic acid index value of at least 75. The carbohydrate is selected from at least one digestible carbohydrate, at least one indigestible carbohydrate, or a mixture thereof. Preferably the confectionary food bar has an initial mechanical hardness of from 100 g force to 750 g force, and the confectionary food bar has an increase in mechanical hardness of less than 200 g force for a period of 35 days from formulation of the food bar.

In a further aspect, the present invention is a method of producing a soft confectionary high protein food bar having a long shelf-life. A structural protein material, a binding protein material, and a carbohydrate are mixed together to form a dough. The structural protein material contains at least 90% soy protein, by weight; has a soluble solids index of between 20% and 40%; and has a trinitrobenzene sulfonic acid index value of less than 35. The binding protein material contains at least 90% soy protein, by weight; has a soluble solids index of at least 70%; and has a soluble trinitrobenzene sulfonic acid index value of at least 75. The carbohydrate is selected from at least one digestible carbohydrate, at least one indigestible carbohydrate, or a mixture thereof. The dough is then sheeted and cut to form a confectionary bar having an initial mechanical hardness of less than 200 g force which has in increase in mechanical hardness of less than 200 g force for a period of 35 days from formation of the bar.

BRIEF DESCRIPTION OF THE DRAWINGS

FIG. 2 is a graph showing the relative hardness of a confectionary food bar containing 30% soy protein as a measure of the relative amounts of a binding soy protein and a structural soy protein material at the time of formation of the food bar and 35 days after formation of the food bar, where the structural protein material has a relative large particle size.

DETAILED DESCRIPTION OF THE INVENTION

Figure 1:
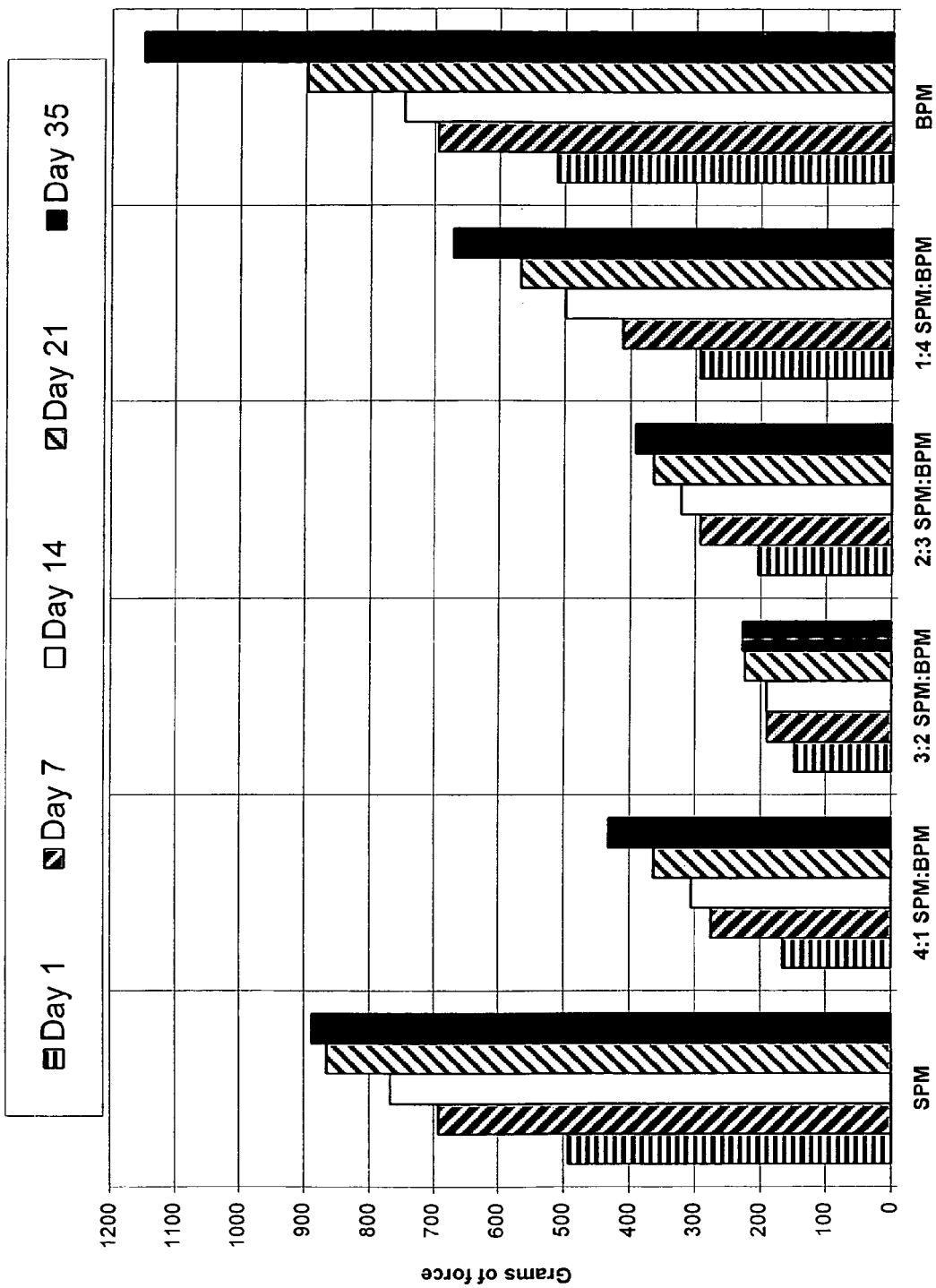
FIG. 1 is a graph showing the relative hardness of a confectionary food bar containing 30% soy protein as a measure of the relative amounts of a binding soy protein and a structural soy protein material at the time of formation of the food bar and 35 days after formation of the food bar.

The present invention is the discovery that a blend of relatively unhydrolyzed soy protein material having moderate solubility in an aqueous medium in combination with a relatively highly hydrolyzed soy protein having relatively high solubility in an aqueous medium is effective to produce a softer, more palatable texture in a high protein confectionary food bar than either soy protein material alone. The present invention also includes the discovery that the blend of soy protein materials is very effective at maintaining the soft, palatable texture in a high protein confectionary food bar over an extended period of time so the food bar will have a long shelf-life. Surprisingly, the present inventors have found that the protein blend and particularly the structural protein material need not have a low water absorption capacity to form soft, palatable high protein confectionary food bars.

DEFINITIONS

As used herein, the term "soluble solids index" (hereinafter "SSI") refers to the solubility of a soy protein material in an aqueous solution as measured according to the following formula:

$$SSI\ (\%) = \left(\frac{\text{Soluble Solids}}{\text{Total Solids}}\right) \times 100.$$

Soluble Solids and Total Solids are determined as follows:
1. A sample of the protein material is obtained by accurately weighing out 12.5 g of protein material.
2. 487.5 g of deionized water is added to a quart blender jar.
b 3. 2 to 3 drops of defoamer (Dow Corning Antifoam B Emulsion, 1:1 dilution with water) is added to the deionized water in the blender jar.
4. The blender jar containing the water and defoamer is placed on a blender (Osterizer), and the blender stirring speed is adjusted to create a moderate vortex (about 14,000 rpm).
5. A timer is set for 90 seconds, and the protein sample is added to the water and defoamer over a period of 30 seconds while blending. Blending is continued for the remaining 60 seconds after addition of the protein sample (total blending time should be 90 seconds from the start of addition of the protein sample).
6. The resulting protein material sample/water/defoamer slurry is then transferred to a 500 ml beaker containing a magnetic stirring bar. The beaker is then covered with plastic wrap or aluminum foil.
7. The covered beaker containing the slurry is then placed on a stirring plate, and the slurry is stirred at moderate speed for a period of 30 minutes.
8. 200 g of the slurry is then transferred into a centrifuge tube. A second 200 g sample of the slurry is then transferred into a second centrifuge tube. The remaining portion of the slurry in the beaker is retained for measuring total solids.
9. The 2 centrifuge tube samples are then centrifuged at 500×g for 10 minutes (1500 rpm on an IEC Model K).
10. At least 50 ml of the supernatant is withdrawn from each centrifuge tube and placed in a plastic cup (one cup for each sample from each centrifuge tube, 2 total cups).
11. Soluble Solids is then determined by drying a 5 g sample of each supernatant at 130° C. for 2 hours, measuring the weights of the dried samples, and averaging the weights of the dried samples.
12. Total Solids is determined by drying two 5 g samples of the slurry retained in the beaker, measuring the weights of the dried samples, and averaging the weights of the dried samples.
13. The Soluble Solids Index (SSI) is calculated from the Soluble Solids and Total Solids according to the formula above.

As used herein, the "trinitrobenzene sulfonic acid" test (hereinafter "TNBS") is used to provide a measure of the degree of hydrolysis of soy proteins. Primary amines occur in soy proteins as amino terminal groups and also as the amino group of lysyl residues. The process of hydrolysis cleaves the peptide chain structure of soy proteins creating one new amino terminal with each break in the chain. The intensity of color developed from a TNBS-amine reaction is proportional to the total number of amino terminal groups in a soy protein sample, and, therefore, is an indicator of the degree of hydrolysis of the protein in the sample. The TNBS value, as used herein, is defined according to the following formula:

$$TNBS\ \text{value (moles NH}_2/10^5\ \text{g protein)} = (As_{420} - Ab_{420}) \times 8.073 \times 10 \times F \times \frac{100}{P},$$

where $As_{420}$ is the absorbance of a TNBS sample solution at 420 nm; $Ab_{420}$ is the absorbance of a TNBS reagent blank at 420 nm; F is the dilution factor; and P is the protein content of the sample by Kjeldahl or Kjel-Foss. The TNBS procedure used herein to measure the TNBS value is a simplified TNBS procedure relative to a similar analytical procedure to measure TNBS where the protein content is measured using a Biruet solution—and this procedure should not be confused with the TNBS procedure which utilizes a Biruet solution to measure protein content since the Biruet procedure produces inflated TNBS values for highly hydrolyzed soy proteins. In the simplified TNBS procedure $As_{420}$, $Ab_{420}$, F, and P values are determined as follows:
1. A 0.3M TNBS solution is prepared by mixing 0.5 g of TNBS*5H$_2$O in 5 ml of deionized water.
2. A sodium borate buffer is prepared by dissolving 19.07 g Na$_2$B$_4$O$_7$*10H$_2$O in 800 ml of deionized water; adjusting the pH of the resulting solution to 9.5 with 1N NaOH; and diluting the solution to 1000 ml.
3. A phosphate-sulfite solution is prepared by mixing 1.0 ml of a 0.1M sodium sulfite solution (0.189 g Na$_2$SO$_3$ diluted to 10 ml volume with deionized water) with 99 ml of a 0.1M sodium phosphate solution (13.8 g NaH$_2$PO$_4$*H$_2$O diluted to 1000 ml volume with deionized water).
4. 3 samples of 0.1 g of the highly hydrolyzed protein material are separately mixed with 100 ml of 0.025N NaOH and stirred for 10 minutes to dissolve the protein in the solution.
5. Each sample is filtered through a Whatman No. 4 filter paper, and the filtrate of each sample is collected.
6. $As_{420}$ and $Ab_{420}$ are measured from the filtrates of the samples and a blank as follows:
   a. For each sample, 2 ml of the filtrate is transferred to a test tube and diluted to 10 ml with 8 ml of the sodium borate buffer.
   b. Three reagent blanks are formed by diluting 2 ml of 0.025N NaOH to 10 ml with 8 ml of the sodium borate buffer.

c. 2 ml aliquots of each buffered sample and each blank are then transferred to separate test tubes.

d. 200 µl of the 0.3M TNBS solution is added to each sample and blank, mixed for 5 seconds with a vortex mixer then placed in a light free area for 15 minutes.

e. The TNBS reaction is terminated at exactly 15 minutes for each blank and sample by adding 4 ml of the phosphate-sulfite solution.

f. The absorbance of the samples and blanks is measured against deionized water at 420 nm on a spectrophotometer within 20 minutes after the addition of the phosphate-sulfite buffer.

g. $As_{420}$ is determined by averaging the measured absorbance of the samples at 420 nm; and $Ab_{420}$ is determined by averaging the absorbance of the blanks at 420 nm.

h. If necessary, as a result of not being able to obtain an accurate absorbance due to the concentration of the sample, step 4(a) is repeated and diluted by a factor of 10 with the sodium borate buffer. Steps 6(b)-6(g) are then repeated with the diluted sample. This is repeated until an accurate absorbance can be obtained. F in the TNBS equation is equal to 1 if no dilution is required, and is equal to the dilution factor if dilution is required (e.g. 1 dilution by a factor of 10 will result in an F of 0.1, 2 dilutions by a factor of 10 will result in an F of 0.01, etc.).

7. The protein content of each sample (P value) is determined using a Kjeldahl or Kjel-Foss analysis. The Nitrogen-Ammonia-Protein Modified Kjeldahl Method of A.O.C.S. Methods Bc4-91 (1997), Aa 5-91 (1997), and Ba 4d-90 (1997) are used in the determination of the protein content. The Nitrogen-Ammonia-Protein Modified Kjeldahl Method may be performed as follows with a soy material sample. 0.0250-1.750 grams of the soy material are weighed into a standard Kjeldahl flask. A commercially available catalyst mixture of 16.7 grams potassium sulfate, 0.6 grams titanium dioxide, 0.01 grams of copper sulfate, and 0.3 grams of pumice is added to the flask, then 30 milliliters of concentrated sulfuric acid is added to the flask. Boiling stones are added to the mixture, and the sample is digested by heating the sample in a boiling water bath for approximately 45 minutes. The flask should be rotated at least 3 times during the digestion. 300 milliliters of water is added to the sample, and the sample is cooled to room temperature. Standardized 0.5N hydrochloric acid and distilled water are added to a distillate receiving flask sufficient to cover the end of a distillation outlet tube at the bottom of the receiving flask. Sodium hydroxide solution is added to the digestion flask in an amount sufficient to make the digestion solution strongly alkaline. The digestion flask is then immediately connected to the distillation outlet tube, the contents of the digestion flask are thoroughly mixed by shaking, and heat is applied to the digestion flask at about a 7.5-min boil rate until at least 150 milliliters of distillate is collected. The contents of the receiving flask are then titrated with 0.25N sodium hydroxide solution using 3 or 4 drops of methyl red indicator solution −0.1% in ethyl alcohol. A blank determination of all the reagents is conducted simultaneously with the sample and similar in all respects, and correction is made for blank determined on the reagents. The nitrogen content of the sample is determined according to the formula: Nitrogen (%)=1400.67×[[(Normality of standard acid)×(Volume of standard acid used for sample (ml))]−[(Volume of standard base needed to titrate 1 ml of standard acid minus volume of standard base needed to titrate reagent blank carried through method and distilled into 1 ml standard acid (ml))×(Normality of standard base)]−[(Volume of standard base used for the sample (ml))×(Normality of standard base)]]/(Milligrams of sample). The protein content is 6.25 times the nitrogen content of the sample.

8. The TNBS value is then determined using the $As_{420}$, $Ab_{420}$, F, and P values determined in steps 6 and 7.

As used herein, the term "mechanical hardness" refers to the hardness of a confectionary food bar as measured by the grams of force necessary to compress the bar a preset distance using a probe. Mechanical hardness is measured utilizing a Texture Expert Exceed Texture Analyzer—#TAxT21 (25 kg load cell) and corresponding software, where a TA-55 probe is the probe used for determining mechanical hardness. The force of the Texture Analyzer is calibrated for zero force (no weight on the calibration platform) and for 5 kg (5 kg weight on the calibration platform). The probe is calibrated by setting the distance of the probe as close as possible to the Analyzer platform. The mechanical hardness of the food bar is measured by placing the food bar on the platform centered under the probe. The Texture Analyzer is set to move the probe 1 mm/s at a force of 100 g, and the probe is driven into the food bar up to half the height of the food bar. The Texture Analyzer is also set to acquire 200 data points per second during the insertion of the probe into the food bar. After the probe has retracted and finished moving, the food bar is moved on the platform to position one side of the food bar under the probe, and the mechanical hardness of the food bar is measured in the same manner on the side of the food bar as the center was measured. The mechanical hardness of the other side of the food bar is then measured in the same manner. The measured "mechanical hardness" is then calculated as the average of the center and side measurements.

The term "initial mechanical hardness", as used herein, refers to the mechanical hardness of the food bar within 1 day (24 hours) of formulation of the food bar.

"Shelf-life", as the term is used herein, refers to the maintenance of softness of a confectionary food bar over an extended period of time. In particular, as used herein, a confectionary food bar has a desirable shelf-life if the mechanical hardness of the food bar increases less than 200 g of force over a period of 35 days from the formulation of the food bar.

As used herein, measurements determining an "increase in mechanical hardness" over time are made on food bars which are stored in a controlled environment chamber at 29° C. during the period prior to testing the mechanical hardness, excepting periods when the food bar was taken out of the controlled environment chamber for previous mechanical hardness measurements.

"Retained on a 325 mesh (U.S.) screen" as used herein, refers to the amount of a particulate material that is retained on a 325 mesh (U.S.) screen (44 µm screen) after the particulate material is placed on the screen; the screen is equipped with a Alpine Air Jet Sieve 200, vacuum gauge, and cleaner; and the material on the screen pulled with vacuum for 3 minutes to draw small particulate material through the screen.

"Water absorption capacity", as used herein, refers to the amount of water absorbed by a soy protein material as measured by the AACC 88-04 method at pH 5.5.

Novel Protein Composition for Use in Confectionary Food Bars and Novel Confectionary Food Bars Protein Composition The present invention is directed to a protein containing composition that is useful for formulating confectionary food bars that contain relatively high amounts of protein yet are texturally soft and retain softness over an extended period of time so that the food bars have a long shelf-life. The protein containing composition contains a structural protein material and a binding protein material. The structural protein material provides structural body to the confectionary food bar, while the binding protein material serves to bind the ingredients of the food bar together.

The structural protein material of the protein containing composition is a soy protein isolate containing at least 90% soy protein by weight of the structural protein material. The structural protein material is moderately soluble in water, and has an SSI of 20% to 40%. The soy protein in the structural protein material is unhydrolyzed or has been subjected to little hydrolysis, having a TNBS value of less than 35. The structural protein material has a moderate water absorption capacity, having a typical water absorption capacity of 2.7 to 3.2 grams of water per gram of protein material at a pH of 5.5.

In a preferred embodiment, the structural protein material has a relatively large particle size. The present inventors have found that a large particle size structural protein material decreases the chewiness of a confectionary food bar in which it is incorporated in accordance with the present invention relative to a similar structural protein material having smaller particle size, while maintaining an equivalent softness. It is preferred that the large particle size structural protein material have a particle size such that at least 50% of the structural protein material, by weight, is retained on a 325 mesh screen (U.S.), or at least 50% of the structural protein material, by weight, has a particle size of at least 44 μm.

The binding protein material of the protein containing composition is a soy protein isolate containing at least 90% soy protein by weight of the binding protein material. The binding protein material is highly soluble in water, and has a SSI of at least 70%. The soy protein in the binding protein material is highly hydrolyzed, having a TNBS value of at least 75. The binding protein material has a relatively low water absorption capacity, having a typical water absorption capacity of 1.4 to 1.6 g of water per gram of protein material at a pH of 5.5. The binding protein material also has a low viscosity in an aqueous medium, an aqueous slurry containing 20% binding protein material, by weight, preferably having an RVA viscosity of less than 100 cps at 25° C., more preferably having an RVA viscosity of less than 50 cps at 25° C.

The binding protein material is dispersed in the structural protein material in the protein containing composition. The protein containing composition must contain at least 5% of the binding protein material, by weight, and at least 5% of the structural protein material, by weight, where the total of the binding protein material and the structural protein material forms at least 90% of the protein containing composition, by weight. The mixture of the binding protein material and the structural protein material provides a softening effect on the texture of a confectionary food bar containing the protein containing composition relative to a confectionary food bar containing either the binding protein material or the structural protein material alone. Preferably the protein containing composition contains from 5% to 95% of the binding protein material, by weight, combined with from 95% to 5% of the structural protein material, by weight. More preferably the protein containing material contains from 10% to 80% of the binding protein, by weight, and from 90% to 20% of the structural protein material, by weight, since the softening effect of the combination of the binding protein material and the structural protein material is greatest at these levels. Most preferably, the protein containing composition contains from 20% to 60% of the binding protein material, by weight, and from 80% to 40% of the structural protein material, by weight.

Confectionary Food Bar Composition

The present invention is also directed to a confectionary food bar containing a structural protein material, a binding protein material, and at least one carbohydrate. The confectionary food bar contains from 20% to 45% soy protein, by weight, and is texturally soft and retains softness over an extended period of time so that the food bar has a long shelf-life. The combination of the structural protein material and the binding protein material provides the food bar with a soft texture that is not possible in a confectionary food bar formed utilizing either the structural protein material or the binding protein material alone. The structural protein material provides structural body to the confectionary food bar, while the binding protein material serves to bind the ingredients of the food bar together.

The structural protein material of the confectionary food bar is a soy protein isolate containing at least 90% soy protein by weight of the structural protein material. The structural protein material is moderately soluble in water, and has an SSI of 20% to 40%. The soy protein in the structural protein material is unhydrolyzed or has been subjected to little hydrolysis, and the structural protein material has a TNBS value of less than 35. The structural protein material has a moderate water absorption capacity, having a typical water absorption capacity of 2.7 to 3.2 grams of water per gram of protein material at a pH of 5.5.

In a preferred embodiment, the structural protein material has a relatively large particle size. The present inventors have found that a large particle size structural protein material decreases the chewiness of the confectionary food bar in which it is incorporated in accordance with the present invention relative to a similar structural protein material having smaller particle size, while maintaining an equivalent softness. It is preferred that the large particle size structural protein material have a particle size such that at least 50% of the structural protein material, by weight, is retained on a 325 mesh screen (U.S.), or at least 50% of the structural protein material, by weight, has a particle size of at least 44 μm.

The binding protein material of the confectionary food bar is a soy protein isolate containing at least 90% soy protein by weight of the binding protein material. The binding protein material is highly soluble in water, and has an SSI of at least 70%. The soy protein in the binding protein material is highly hydrolyzed, and the binding protein material has a TNBS value of at least 75. The binding protein material has a relatively low water absorption capacity, having a typical water absorption capacity of 2.0 to 2.4 g of water per gram of protein material at a pH of 5.5. The binding protein material also has a low viscosity in an aqueous medium, preferably an aqueous slurry containing 20% of the binding protein material, by weight, having a RVA viscosity of less than 100 cps at 25° C., and more preferably less than 50 cps at 25° C.

The binding protein material and the structural protein material are dispersed in the confectionary food bar. The confectionary food bar must contain at least 5% of the binding protein material, by weight of total protein in the food bar, and at least 5% of the structural protein material, by weight of total protein in the food bar. Preferably, the total protein from the binding protein material and the structural protein material provides at least 90% of the total protein in the food bar, by weight. The mixture of the binding protein material and the structural protein material provides a softening effect on the texture of the confectionary food bar relative to a confectionary food bar containing either the binding protein material or the structural protein material alone. Preferably the confectionary food bar contains from 5% to 95% of the binding protein material, by weight of total protein contributing ingredients in the food bar, combined with from 95% to 5% of the structural protein material, by weight of total protein contributing ingredients in the food bar. More preferably the confectionary food bar contains from 10% to 80% of the binding protein, by weight of total protein contributing ingredients in the food bar, and from 90% to 20% of the structural protein material, by weight of total protein contributing ingredients in the food bar, since the softening effect of the combination of the binding protein material and the structural protein material is greatest at these levels. Most preferably, the confectionary food bar contains from 20% to 60% of the binding protein material, by weight of total protein contributing ingredients in the food bar, and from 80% to 40% of the structural protein material, by weight of total protein contributing ingredients in the food bar. In a most preferred embodiment, all of the soy protein in the confectionary food bar is provided by the structural protein material and the binding protein material.

Preferably the structural protein material and the binding protein material in the confectionary food bar are present in the food bar in a weight ratio of from 1.0:4.0 to 9.0:1.0 structural protein material to binding protein material. Most preferably the structural protein material and the binding protein material are present in the food bar in a weight ratio of from 1.0:1.5 to 4.0:1.0 structural protein material to binding protein material. In the most preferred embodiment of the present invention, the structural protein material and the binding protein material are present in the above ratios, and the structural protein material and binding protein material provide all the protein in the confectionary food bar, where the protein in the structural protein material and the binding protein material is soy protein.

The confectionary food bar may also contain protein from sources other than the structural protein material and the binding protein material, and from sources other than soy. For example, dairy proteins from whey protein concentrates, whey protein isolates, whey protein hydrolyzates, and caseinates, either calcium and/or sodium blends, are useful in the confectionary food bar in conjunction with the structural protein material and the binding protein material.

The carbohydrate of the confectionary food bar is selected from one or more digestible carbohydrate, one or more indigestible carbohydrate, or a mixture thereof. Preferably the carbohydrate contains a digestible carbohydrate selected from high fructose corn syrup, corn syrup, sucrose, honey, and glucose-fructose syrup, but other digestible carbohydrates may be included. In a preferred embodiment the digestible carbohydrate contains a mixture of 63 DE (degree of esterification) corn syrup and high fructose corn syrup (55% solids) that is cooked to a standard 82 Brix. Most preferably, this mixture has a ratio of 63 DE corn syrup to 55% High Fructose Corn Syrup of from 85:15 to 15:85 parts by weight, and most preferably 55:45 parts by weight.

The carbohydrate may also include an indigestible carbohydrate, preferably polymers such as polydextrose, sorbitol, or xylitol in a 70% solution (solids in water). The indigestible carbohydrate may also include a fiber such as soy cotyledon fiber, or may be glycerin, maltitol, hydrogenated starch hydrolysates, or eryrthritol. Preferred soy cotyledon fiber materials for use as the indigestible carbohydrate include FIBRIM® 1020, 1260, 1450, and 2000 which are commercially available from The Solae Company, St. Louis, Mo. The indigestible carbohydrate is preferably included in the confectionary food bar at a level of from 0%, by weight, to 6%, by weight.

The confectionary food bar also preferably contains a flavoring agent. Preferred flavoring agents include cocoa powder, peanut flavor, vanilla, chocolate, and caramel.

The confectionary food bar may also be enrobed in a coating, if desired. The optional coating may be formed utilizing any conventional commercially available coating. The coating may be a sugar based or sugar free compound coating.

The confectionary food bar of the present invention has a desirable soft palatable texture. The confectionary food bar of the invention has an initial mechanical hardness of from 100 g force to 750 g force. More preferably the confectionary food bar has an initial mechanical hardness of from 100 g force to 350 g force. Most preferably the confectionary food bar has an initial mechanical hardness of from 100 g force to 250 g force.

The confectionary food bar of the present invention also has a desirable long shelf life, and maintains its textural softness and palatability for an extended period of time. A long shelf-life is especially desirable in high protein confectionary food bars since such food bars are often displayed for sale on a retail shelf for extended periods of time. The confectionary food bar of the present invention preferably has an increase in mechanical hardness of less than 200 g force for a period of 35 days from the formulation of the food bar. More preferably, the food bar has an increase in mechanical hardness of less than 150 g force for a period of 35 days from the formulation of the food bar. Most preferably, the confectionary food bar of the present invention has an increase in mechanical hardness of less than 100 g force for a period of 35 days from the formulation of the food bar.

Process for Producing a Novel Protein Composition for Use in Confectionary Food Bars and for Producing Novel Confectionary Food Bars Novel Protein Composition The novel protein composition of the present invention is produced by mixing a structural protein material and a binding protein material. The structural protein material and the binding protein material can be mixed by dry blending the materials according to conventional processes for dry blending powdered materials. Alternatively, an aqueous slurry of the structural protein material can be mixed with an aqueous slurry of the binding protein material, the resulting slurry mixed by stirring or subjecting the slurry to shear, and the mixed slurry dried, preferably by spray drying, to produce the novel protein composition. The structural protein material and the binding protein material have the characteristics described above, respectively.

The structural protein material and the binding protein material are each soy protein isolate materials containing at least 90% soy protein, by weight of the dry structural or binding protein material. The structural protein material and the binding protein material are produced from a soy protein curd material that is formed in accordance with conventional soy protein isolate production processes.

The soy protein curd material may be formed from commodity soybeans according to the following process. The soybeans are detrashed by passing the soybeans through a magnetic separator to remove iron, steel, and other magnetically susceptible objects, followed by shaking the soybeans on progressively smaller meshed screens to remove soil residues, pods, stems, weed seeds, undersized beans, and other trash. The detrashed soybeans are then cracked by passing the soybeans through cracking rolls. Cracking rolls are spiral-cut corrugated cylinders which loosen the hull as the soybeans pass through the rolls and crack the soybean material into several pieces. Preferably the cracked soybeans are conditioned to 10% to 11% moisture at 63 to 74° C. to improve the storage quality retention of the soybean material. The cracked soybeans are then dehulled, preferably by aspiration. Soy hypocotyls, which are much smaller than the cotyledons of the soybeans, may be removed by shaking the dehulled soybeans on a screen of sufficiently small mesh size to remove the hypocotyls and retain the cotyledons of the beans. The hypocotyls need not be removed since they comprise only about 2%, by weight, of the soybeans while the cotyledons comprise about 90% of the soybeans by weight, however, it is preferred to remove the hypocotyls since they are associated with the beany taste of soybeans. The dehulled soybeans, with or without hypocotyls, are then flaked by passing the soybeans through flaking rolls. The flaking rolls are smooth cylindrical rolls positioned to form flakes of the soybeans as they pass through the rolls having a thickness of from about 0.01 inch to about 0.015 inch.

The flakes are then defatted. The flakes are defatted by extracting the flakes with a suitable solvent to remove the oil from the flakes. Preferably the flakes are extracted with n-hexane or n-heptane in a countercurrent extraction. The defatted flakes should contain less than 1.5% fat or oil content, and preferably less than 0.75%. The solvent-extracted defatted flakes are then desolventized to remove any residual solvent using conventional desolventizing methods, including desolventizing with a flash desolventizer-deodorizer stripper, a vapor desolventizer-vacuum deodorizer, or desolventizing by down-draft desolventization. Alternatively, the flakes may be defatted by a conventional mechanical expeller rather than by solvent extraction. Defatted soy flakes are commercially available, and the steps of producing the flakes may be avoided by purchasing the flakes.

Preferably, the defatted flakes are comminuted into a soy flour or a soy grit to improve the protein extraction yield from the flakes. The flakes are comminuted by grinding the flakes to the desired particle size using conventional milling and grinding equipment such as a hammer mill or an air jet mill. Soy flour has a particle size wherein at least 97%, by weight, of the flour has a particle size of 150 microns or less (is capable of passing through a No. 100 mesh U.S. Standard Screen). Soy grits, more coarsely ground than soy flour, have a particle size greater than soy flour but smaller than soy flakes. Preferably the soy grit has a particle size of from 150 microns to about 1000 microns (is capable of passing though a No. 10-No. 80 U.S. Standard Screen). Preferably the soy flakes, soy flour, or soy grit is treated with a sulfite such as sodium sulfite to improve the flow characteristics and microbial control of the soy material.

To produce the soy protein curd material, the soy flakes, soy flour, or soy grit is/are extracted with water or an aqueous solution having a pH of from 6.7 to 11 to extract the protein in the flakes/flour/grit from insoluble materials such as fiber. The soy flakes, flour, or grit is/are preferably extracted with an aqueous sodium hydroxide solution having a pH from about 8 to about 11, although other aqueous alkaline extractants such as ammonium hydroxide are also effective. Preferably the weight ratio of the extractant to the soy flake/flour/grit material is from about 5:1 to about 16:1.

After extraction, the extract is separated from the insoluble materials. Preferably the separation is effected by filtration or by centrifugation and separation of the extract from the insoluble materials. The pH of the separated extract is then adjusted to about the isoelectric point of soy protein to precipitate a soy protein curd so that the soy protein can be separated from soy solubles including flatulence inducing oligosaccharides and other water soluble carbohydrates. The pH of the separated extract is adjusted with a suitable acid to the isoelectric point of soy protein, preferably to a pH of from about pH 4 to about pH 5, most preferably from about pH 4.4 to about pH 4.6. Suitable edible acids for adjusting the pH of the extract to about the isoelectric point of soy protein include hydrochloric acid, sulfuric acid, nitric acid, or acetic acid. The precipitated protein material (curd) is separated from the extract (whey), preferably by centrifugation or filtration to produce the soy protein curd material. The separated soy protein curd material is preferably washed with water to remove residual solubles, preferably at a weight ratio of water to protein material of about 5:1 to about 12:1.

Structural Protein Material

To produce the structural protein material of the present invention, the soy protein curd material is first neutralized to a pH of 6.8 to 7.2 with an aqueous alkaline solution or an aqueous alkaline earth solution, preferably a sodium hydroxide solution or a potassium hydroxide solution. The neutralized soy protein curd material is then heated. Preferably the neutralized soy curd is heated at a temperature of from about 75° C. to about 160° C. for a period of from about 2 seconds to about 2 hours, where the curd is heated for a longer time period at lower temperatures and a shorter period at higher temperatures. More preferably the soy protein curd material is treated at an elevated temperature and under a positive pressure greater than atmospheric pressure.

The preferred method of heating the soy protein curd material is treating the soy curd at a temperature elevated above ambient temperatures by injecting pressurized steam into the curd, hereafter referred to as "jet-cooking." The following description is a preferred method of jet-cooking the soy protein curd material, however, the invention is not limited to the described method and includes any obvious modifications which may be made by one skilled in the art.

The soy protein curd material is introduced into a jet-cooker feed tank where the soy curd is kept in suspension with a mixer which agitates the soy curd. The curd is directed from the feed tank to a pump which forces the curd through a reactor tube. Steam is injected into the curd under pressure as the curd enters the reactor tube, instantly heating the curd to the desired temperature. The temperature is controlled by adjusting the pressure of the injected steam, and preferably is from about 75° C. to about 160° C., more preferably from about 100° C. to about 155° C. The curd is treated at the elevated temperature for treatment time being controlled by the flow rate of the slurry through the tube. Preferably the flow rate is about 18.5 lbs./minute, and the cook time is about 9 seconds at about 150° C.

To produce the structural protein material the heated curd is then cooled and dried. The curd may be cooled and dried in any conventional manner known in the art. In a preferred embodiment of the present invention, the curd is cooled by flash vaporization. The heated curd is flash vaporized by introducing the hot curd into a vacuumized chamber having an internal temperature of from 20° C. to 85° C., which instantly drops the pressure about the curd to a pressure of from about 25 mm to about 100 mm Hg, and more preferably to a pressure of from about 25 mm Hg to about 30 mm Hg. Most preferably the hot curd is discharged from the reactor tube of the jet-cooker into the vacuumized chamber, resulting in an instantaneous large pressure and temperature drop which vaporizes a substantial portion of water from the curd, instantly cooling the curd to a temperature. Preferably the vacuumized chamber has an elevated temperature up to about 85° C. to prevent the gelation of the soy protein curd material upon introduction of the curd into the vacuumized chamber.

Applicants believe the flash vaporization step provides a soy material having low concentrations of volatile compounds associated with the beany, bitter flavor of soy such as n-pentane, diacetyl, pentanal, hexanal, 2-heptanone, 2-pentyl furan, and octanal. The heat treatment under pressure followed by the rapid pressure drop and vaporization of water also causes vaporization of substantial amounts of these volatile components, removing the volatile components from the soy material, and thereby improving the taste of the soy material.

The flash vaporized structural protein material may then be dried, preferably by spray drying. Preferably the spray-dryer is a co-current flow dryer where hot inlet air and the structural protein material, atomized by being injected into the dryer under pressure through an atomizer, pass through the dryer in a co-current flow.

In a preferred embodiment, the structural protein material is injected into the dryer through a nozzle atomizer. Although a nozzle atomizer is preferred, other spray-dry atomizers, such as a rotary atomizer, may be utilized. The curd is injected into the dryer under enough pressure to atomize the slurry. Preferably the slurry is atomized under a pressure of about 3000 psig to about 5500 psig, and most preferably about 3500 to 5000 psig. Hot air is injected into the dryer through a hot air inlet located so the hot air entering the dryer flows co-currently with the atomized soy curd sprayed from the atomizer. The hot air has a temperature of about 285° C. to about 315° C., and preferably has a temperature of about 290° C. to about 300° C.

The dried structural soy protein material is collected from the spray dryer. Conventional means and methods may be used to collect the soy material, including cyclones, bag filters, electrostatic precipitators, and gravity collection. The structural soy protein material may be ground according to conventional powder grinding processes, however, since a large particle size structural soy protein material is preferred to provide soft texture, it is preferable that the structural soy protein material remain unground.

Binding Protein Material

The binding protein material is formed from the soy protein curd material in much the same manner as the structural protein material, however, a enzymatic protein hydrolyzation step is included to hydrolyze the protein. The soy protein curd material is first neutralized to a pH of from 7.2 to 7.6 with an aqueous alkaline solution or an aqueous alkaline earth solution, preferably a sodium hydroxide solution or a potassium hydroxide solution. The neutralized soy protein curd is heated and cooled, preferably by jet cooking and flash cooling, in the same manner as described above with respect to preparation of the structural protein material. Preferably the curd is cooled to 55° C. to 60° C. after heating.

The soy protein curd material is then treated with an enzyme that is effective to hydrolyze soy protein at a temperature and for a time effective to hydrolyze the soy protein curd material so that the soy protein curd material has an TNBS value of at least 70. A preferred enzyme to effect the protein hydrolysis is bromelain, where the bromelain is added to the soy protein curd material at a concentration of from 1% to 10% enzyme to total weight of the solids in the soy protein curd. The enzyme is contacted with the soy protein curd material at a temperature of from 40° C. to 65° C., preferably at about 60° C. for a period of from 10 minutes to 65 minutes, preferably from 20 minutes to 45 minutes, to hydrolyze the protein.

The hydrolysis is terminated by heating the hydrolyzed soy protein curd material to a temperature effective to inactivate the enzyme. Most preferably the hydrolyzed soy protein curd material is jet cooked to inactivate the enzyme, and flash cooled then dried as described above with respect to producing the structural protein material. The flash cooled hydrolyzed soy protein material is the binding protein material, and the dried hydrolyzed material is the dried binding protein material.

Confectionary Food Bars

The confectionary food bars of the present invention are formed by blending the structural protein material; the binding protein material; a carbohydrate containing material containing at least one carbohydrate; flavor ingredients such as cocoa powder, peanut flavor, vanilla, chocolate, and caramel; and any other desired ingredients such as vitamins and minerals into a dough. The dough is then extruded and cut to form the food bars according to conventional processes for extruding confectionary food bars. If desired, the food bars may then be enrobed in a coating.

Preferably the dough is formed by combining a syrup of the carbohydrate material and other ingredients, such as flavor ingredients, with a dry blend of the structural protein material and the binding protein material to form the dough. The syrup of carbohydrate material preferably contains at least one carbohydrate selected from the group consisting of high fructose corn syrup, corn syrup, sucrose, honey, high maltose corn syrup, and glucose-fructose syrup, polydextrose in a 70% solution (solids in water), sorbitol in a 70% solution (solids in water), xylitol in a 70% solution (solids in water), glycerin, maltitol, erythritol, and soy cotyledon fiber in a 70% solution (solids in water). The syrup is cooked at a temperature of 108° C. then cooled to 50° C. to 65° C. to bring the syrup to 76° to 86° Brix, and more preferably to 80° to 84° Brix. The flavors and other ingredients are then added to the syrup, and the syrup and protein materials are combined and mixed. Preferably the structural and binding protein materials are included in the mixture so that the protein materials are present in an amount of from 20% to 45% of the mixture, by weight. After the dough is thoroughly mixed it is extruded. The extruded dough is then cut into food bars of a desirable size. If desired, the food bars may be enrobed with a commercially available coating.

EXAMPLES

The present invention is illustrated by the following examples. The formulations of the examples are intended to be illustrative, and the invention is not limited in scope to the specific formulas provided.

Example 1

Protein compositions in accordance with the present invention are provided. A structural protein material is provided having a soy protein content of 91.5% by weight on a dry basis. The structural protein material has a TNBS value of 31, a water absorption capacity of 3.2 ml/g at pH 5.44, and an SSI of 35%. The structural protein material is a large particle size material, where 92.7% of the structural protein material, by dry weight, is retained on a 325 mesh (U.S.) screen. A binding protein material is also provided having a soy protein content of 91%, by dry weight. The binding protein material has a TNBS value of 87, a water absorption capacity of 1.59 ml/g at pH 6.3 and a SSI of 83%. Four protein compositions according to the present invention are formed by dry blending the structural protein material and the binding protein material in weight ratios of 4:1; 3:2; 2:3; and 1:4 of structural protein material to binding protein material, respectively.

Example 2

A raspberry/yogurt confectionary food bar according to the present invention is prepared. The raspberry/yogurt confectionary bar has a protein content of 23.7%, by weight. A liquid mixture is prepared containing 63 DE corn syrup, glycerine, and polydextrose (70% solids). The liquid mixture is heated to 60° C. then cooled to 40° C.-50°. Sorbitol, beet powder, citric acid, malic acid, lactic acid (60% powder), and raspberry flavors are blended with the liquid mixture. A large particle structural protein material, a binding protein material, soy protein nuggets, powdered dextrose, fructose, cellulose gum, sweet dairy whey, Vream A, raspberry powder, raspberry nuggets, corn starch, Novogel BK 2130, salt, vitamins & minerals are then mixed with the liquid mixture to provide a dough. The structural protein material has a soy protein content of 91%, by dry weight, a TNBS value of 31, a water absorption capacity of 3.2 ml/g at pH 5.44, and a SSI of 35%, where 92.7% of the structural protein material, by dry weight, is retained on a 325 mesh (U.S.) screen. The binding protein material has a TNBS value of 87, a water absorption capacity of 1.59 ml/g at pH 6.3 and a SSI of 83%. The dough is kneaded to thoroughly mix the ingredients, then the dough is extruded. The extrudate is cut into food bars. The food bars are then coated with a yogurt compound coating. The raspberry/yogurt food bar contains the ingredients in the proportions set forth in Table 1.

TABLE 1

| Ingredient | mg/g of composition |
| --- | --- |
| 63 DE Corn Syrup | 190.0 |
| Glycerine | 39.6 |
| Polydextrose (70%) | 70.0 |
| Sorbitol | 65.0 |
| Beet Powder | 4.7 |
| Citric Acid | 4.7 |
| Malic Acid | 1.9 |
| Lactic Acid (60% Powder) | 1.6 |
| Raspberry Flavors | 2.0 |
| Structural Protein Material | 118.3 |
| Binding Protein Material | 78.6 |
| Soy Protein Nuggets | 28.2 |
| Powdered Dextrose | 90.0 |
| Fructose | 90.0 |
| Cellulose Gum | 15.5 |
| Sweet Dairy Whey | 15.1 |
| Vream A | 7.1 |
| Raspberry Powder | 9.4 |
| Raspberry Nuggets | 4.7 |

TABLE 1-continued

| Ingredient | mg/g of composition |
| --- | --- |
| Corn Starch | 4.4 |
| Novogel BK 2130 | 3.1 |
| Salt | 0.9 |
| Vitamins & Minerals | 5.2 |
| Yogurt Compound Coating | 150.0 |

Example 3

A high protein confectionary food bar according to the present invention is prepared. A liquid mixture containing glycerin and polydextrose (70% solids) is prepared, heated to 60° C. and cooled to 40° C. to 50° C. Structural protein material, binding protein material, Lycasin 80/55, Farbest 290 Calcium Caseinate, Farbest WPC (80%), shortening, lecithin, dutch cocoa, chocolate flavors, vanilla (4×), salt, sucrolose, and vitamins and minerals are mixed with the liquid mixture to form a dough. The structural protein material has a soy protein content of 91%, by dry weight, a TNBS value of 31, a water absorption capacity of 3.2 ml/g at pH 5.44, and a SSI of 35%, where 92.7% of the structural protein material, by dry weight, is retained on a 325 mesh (U.S.) screen. The binding protein material has an TNBS value of 87, a water absorption capacity of 1.59 ml/g at pH 6.3 and a SSI of 83%. The dough is kneaded to thoroughly mix the components, and then is extruded and cut into a food bar. The food bar contains 40.3% protein, by weight, and contains the ingredients in the amounts set forth in Table 2.

TABLE 2

| Ingredient | mg/g of composition |
| --- | --- |
| Glycerin | 188.3 |
| Polydextrose (70% solids) | 94.2 |
| Lycasin 80/55 | 96.2 |
| Structural Protein Material | 93.2 |
| Binding Protein Material | 62.1 |
| Farbest 290 Calcium Caseinate | 155.3 |
| Farbest WPC, 80% | 155.3 |
| Shortening | 71.9 |
| Lecithin | 7.0 |
| Dutch Cocoa | 57.5 |
| Chocolate Flavors | 7.2 |
| Vanilla (4X) | 2.9 |
| Salt | 1.4 |
| Sucrolose | 0.3 |
| Vitamins and Minerals | 7.2 |

Example 4

A medical nutrition confectionary food bar is prepared in accordance with the present invention. The medical nutrition confectionary food bar contains 22.1% protein, by weight. A liquid mixture is prepared containing 63 DE corn syrup, glycerine, and high fructose corn syrup (55% solids). The liquid mixture is heated to 40° C. to 50° C. A structural protein material, a binding protein material, soy cotyledon fiber (FIBRIM® 1450 available from Solae Company, St. Louis, Mo.), fructooligosaccharides, oil, cellulose RC 951, and citric acid are mixed with the liquid mixture to form a dough. The The structural protein material has a soy protein content of 91%, by dry weight, a TNBS value of 31, a water absorption capacity of 3.2 ml/g at pH 5.44, and a SSI of 35%, where 92.7% of the structural protein material, by dry weight, is retained on a 325 mesh (U.S.) screen. The binding protein material has a TNBS value of 82, a water absorption capacity of 1.2 at pH 5.5 and a SSI of 75%. The dough is kneaded to thoroughly mix the components, and then is extruded and cut into a food bar. The food bar contains the ingredients in the amounts set forth in Table 3.

TABLE 3

| Ingredient | mg/g composition |
| --- | --- |
| Structural Protein Material | 170.0 |
| Soy Cotyledon Fiber | 70.0 |
| 63 DE Corn Syrup | 160.0 |
| High Fructose Corn Syrup (55% solids) | 240.0 |
| Maltodextrin (10 DE) | 110.0 |
| Binding Protein Material | 80.0 |
| Glycerin | 18.0 |
| Oil | 40.0 |
| Fructooligosaccharides | 100.0 |
| Cellulose RC 591 | 10.0 |
| Citric Acid | 2.0 | mixed and cooked to 82° Brix, the temperature of the mixed syrup is adjusted to 60° C. and 59 g of glycerin, 8.2 g of chocolate flavors, and 2 g of vanilla flavor are mixed into the syrup, then the syrup is cooled to 50° C. to form a syrup for combination with one of the dry blended protein compositions. The dry blend of each protein composition and its respective syrup are mixed at 50° C. for 3 minutes 45 seconds in a Winkworth mixer to form a dough. The dough is kneaded, and then sheeted onto a marble slab and cut to form a food bar. Six food bars are formed, one for each of the respective protein compositions. The food bars are stored at 29° C. in a controlled environment chamber and are equilibrated to room temperature for measurement of the hardness. The mechanical hardness of the food bars is measured 1 day, 7 days, 14 days, 21 days, and 35 days after formulation. The measured mechanical hardness is shown in Table 4, where SPM="structural protein material" and BPM="binding protein material", and mechanical hardness is measured in units of grams of force.

TABLE 4

| Period (Days) | Hardness SPM | Hardness 4:1 SPM:BPM | Hardness 3:2 SPM:BPM | Hardness 2:3 SPM:BPM | Hardness 1:4 SPM:BPM | Hardness BPM |
| --- | --- | --- | --- | --- | --- | --- |
| 1 | 493 | 166 | 148 | 204 | 293 | 512 |
| 7 | 692 | 275 | 190 | 293 | 412 | 695 |
| 14 | 768 | 305 | 190 | 322 | 499 | 748 |
| 21 | 866 | 363 | 224 | 364 | 567 | 893 |
| 35 | 888 | 432 | 228 | 393 | 671 | 1150 |

Example 5

Food bars containing 30% protein, by weight, are formed using different concentrations of a structural protein material and/or a binding protein material, and the mechanical hardness of the food bars is measured. SUPRO® 661, a soy protein isolate commercially available from Solae Company, St. Louis, Mo., is used as the structural protein material. A binding protein material is prepared accordance with the description above, where the binding protein material has a TNBS value of 87, a water absorption capacity of 1.59 ml/g at pH 6.3 and a SSI of 83%. Six protein compositions are formed as follows: Composition 1—only the structural protein material (511 g); Composition 2—a 4:1 mixture of structural protein material to binding protein material, by weight (409 g structural protein material: 103 g binding protein material); Composition 3—a 3:2 mixture of structural protein material to binding protein material, by weight (307 g structural protein material: 206 g binding protein material); Composition 4—a 2:3 mixture of structural protein material to binding protein material, by weight (205 g structural protein material: 309 g binding protein material); Composition 5—a 1:4 mixture of structural protein material to binding protein material, by weight (102 g structural protein material: 413 g binding protein material); and Composition only the binding protein material (506 g). Each protein composition is dry blended with 118 g of rice syrup solids (26 DE), 76 g of cocoa powder, 10.5 g of a vitamin and mineral premix, and 1.7 g of salt. 391 g of 63 DE corn syrup and 320 g high fructose corn syrup are The results of Table 4 are shown in graphical form in FIG. 1. As both Table 4 and FIG. 1 show, the mechanical hardness, and, therefore, the texture, of the food bars containing both the structural protein material and the binding protein material is much softer than the food bars containing only the structural protein material or only the binding protein material. The food bars are particularly soft when the food bars contain a 3:2 ratio of structural protein material to binding protein material, by weight. Furthermore, the food bars containing both the structural protein material and binding protein material largely maintain their softness over a period of 35 days, particularly the food bars containing either 3:2 or 2:3 structural protein material to binding protein material, by weight.

Example 6

Food bars containing 30% protein, by weight, are formed using different concentrations of a large particle structural protein material and/or a binding protein material, and the mechanical hardness of the food bars is measured. A large particle structural protein material is prepared according to the process described above. The large particle structural protein material has a soy protein content of 91%, by dry weight, a TNBS value of 31, a water absorption capacity of 3.2 ml/g at pH 5.44, and a SSI of 35%, where 92.7% of the structural protein material, by dry weight, is retained on a 325 mesh (U.S.) screen. The food bars are prepared in the same manner as described in Example 5 utilizing the same binding protein material together with the large particle structural protein material.

After the food bars are prepared, the food bars are stored at 29° C. in a controlled environment chamber and are equilibrated to room temperature for measurement of the hardness of the bars. The mechanical hardness of the food bars is measured 1 day, 7 days, 14 days, 21 days, and 35 days after formulation. The measured mechanical hardness is shown in Table 5, where SPM="large particle structural protein material" and BPM="binding protein material", and mechanical hardness is measured in units of grams of force.

TABLE 5

| Period (Days) | Hardness SPM | Hardness 4:1 SPM:BPM | Hardness 3:2 SPM:BPM | Hardness 2:3 SPM:BPM | Hardness 1:4 SPM:BPM | Hardness BPM |
|---|---|---|---|---|---|---|
| 1 | 451 | 156 | 158 | 228 | 294 | 652 |
| 7 | 644 | 201 | 223 | 284 | 395 | 799 |
| 14 | 651 | 199 | 242 | 296 | 400 | 834 |
| 21 | 667 | 212 | 262 | 268 | 377 | 1116 |
| 35 | 669 | 255 | 364 | 407 | 652 | 1204 |

The results of Table 5 are shown in graphical form in FIG. 2. As both Table 5 and FIG. 2 show, the mechanical hardness, and, therefore, the texture, of the food bars containing both the large particle structural protein material and the binding protein material is much softer than the food bars containing only the large particle structural protein material or only the binding protein material. The food bars are particularly soft when the food bars contain a 4:1 or a 3:2 ratio of large particle structural protein material to binding protein material, by weight. Furthermore, the food bars containing both the large particle structural protein material and binding protein material largely maintain their softness over a period of 35 days, particularly the food bars containing either 4:1 or 3:2 large particle structural protein material to binding protein material, by weight. The large particle bars are also less chewy, a desirable characteristic in a soft confectionary food bar.

Additional embodiments become readily apparent in view of the present invention as described above. Various modifications of the techniques, procedures, and compositions, and materials may be apparent to those skilled in the art from the description of the invention above. It is intended that all such variations within the scope and spirit of the appended claims be embraced thereby.

What is claimed is:

1. A protein containing composition for use in confectionary food bars, comprising:
   (a) a structural protein material containing at least 90% soy protein by weight, said structural protein material having a soluble solids index of between 20% and 40%, having a TNBS value of less than 35, and having a water absorption capacity of 2.7 grams of water to 3.2 grams of water per gram of protein material at a pH of 5.5;
   (b) a binding protein material containing at least 90% soy protein by weight, said binding protein material having a soluble solids index of at least 70% and a TNBS value of at least 75,
Wherein said binding protein material is dispersed in said structural protein material.

2. The protein containing composition of claim 1 wherein said structural protein material is a particulate material, wherein at least 50% of the particles of said particulate material are retained on a 325 mesh (U.S.) screen.

3. The protein containing composition of claim 1 wherein an aqueous slurry of said binding protein material has an RVA viscosity of less than 100 cps at 25° C., where said binding protein material forms 20% of said slurry, by weight.

4. The protein containing composition of claim 1 wherein said structural protein material forms 20% to 90% of said composition, by weight, and said binding protein material forms 80% to 10% of said composition, by weight.

5. The protein containing composition of claim 4 consisting essentially of said structural protein material and said binding protein material.

6. A confectionary food bar, comprising:
   (a) a structural protein material containing at least 90% soy protein by weight, said structural protein material having a soluble solids index of between 20% and 40%, having a TNBS value of less than 35, and having a moderate water absorption capacity of 2.7 grams of water to 3.2 grams of water per gram of protein material at a pH of 5.5;
   (b) a binding protein material containing at least 90% soy protein by weight, said binding protein material having a soluble solids index of at least 70% and a TNBS value of at least 75; and
   (c) a carbohydrate, selected from a digestible carbohydrate, an indigestible carbohydrate, or a mixture thereof,
   Wherein said confectionary food bar contains from 20% to 45% protein, by weight.

7. The confectionary food bar of claim 6 wherein all soy protein in said confectionary food bar is provided by said structural protein material and said binding protein material.

8. The confectionary food bar of claim 7 wherein said structural protein material and said binding protein material are present in said food bar in a weight ratio of from 1:4 to 9:1 structural protein material to binding protein material.

9. The confectionary food bar of claim 6 wherein said structural protein material and said binding protein material are present in said food bar in a weight ratio of from 1:4 to 9:1 structural protein material to binding protein material.

10. The confectionary food bar of claim 6 wherein said food bar has an initial mechanical hardness of from 100 g force to 750 g force.

11. The confectionary food bar of claim 10 wherein said food bar has an initial mechanical hardness of from 100 g force to 350 g force.

12. The confectionary food bar of claim 10 wherein said food bar has an increase in mechanical hardness of less than 200 g force for a period of 35 days from the formulation of said food bar.

13. The confectionary food bar of claim 10 wherein said food bar has an increase in mechanical hardness of less than 150 g force for a period of 35 days from formulation of said food bar.

14. The confectionary food bar of claim 10 wherein said food bar has an increase in mechanical hardness of less than 100 g force for a period of 35 days from formulation of said food bar.

* * * * *